United States Patent
Beyer et al.

(10) Patent No.: US 7,835,748 B2
(45) Date of Patent: Nov. 16, 2010

(54) METHOD FOR ANALYZING THE INTERFERENCE AND SUPPLY SITUATION IN UMTS SUB-NETWORKS

(75) Inventors: Jürgen Beyer, Netphen (DE); Reinhold Brücken, Köln (DE)

(73) Assignee: T-Mobile Deutschland GmbH, Bonn (DE)

( * ) Notice: Subject to any disclaimer, the term of this patent is extended or adjusted under 35 U.S.C. 154(b) by 1025 days.

(21) Appl. No.: 10/551,896

(22) PCT Filed: Apr. 2, 2004

(86) PCT No.: PCT/DE2004/000715

§ 371 (c)(1),
(2), (4) Date: Oct. 10, 2006

(87) PCT Pub. No.: WO2004/091103

PCT Pub. Date: Oct. 21, 2004

(65) Prior Publication Data

US 2007/0111663 A1  May 17, 2007

(30) Foreign Application Priority Data

Apr. 4, 2003  (DE) ................................ 103 15 629

(51) Int. Cl.
*H04W 40/00* (2009.01)
(52) U.S. Cl. .................. 455/446; 455/436; 455/450; 455/453; 455/452.2; 370/328; 370/332
(58) Field of Classification Search .......... 455/436–453
See application file for complete search history.

(56) References Cited

U.S. PATENT DOCUMENTS

| 5,839,074 | A | * | 11/1998 | Plehn | ........................ 455/450 |
| 6,549,781 | B1 | * | 4/2003 | O'Byrne et al. | ............ 455/446 |
| 7,277,709 | B2 | * | 10/2007 | Vadgama | .................... 455/453 |
| 2002/0086679 | A1 | * | 7/2002 | Li et al. | ...................... 455/453 |

FOREIGN PATENT DOCUMENTS

| DE | 42 07 290 A1 | 9/1993 |
| DE | 42 42 808 A1 | 6/1994 |
| DE | 196 48 225 A1 | 6/1998 |

OTHER PUBLICATIONS

J. Laiho, A. Wacker, Radio network planning process and methods for WCDMA, Annals of Telecommunications, vol. 56, No. 5-6, Mai/Juin 2001, © 2001/2002 Hermes Penton Science.*
D, Calin et al., "Performance and Interference Analysis of WCDMA System"; IEEE, 2001, pp. 2479-2483.

* cited by examiner

*Primary Examiner*—Lester Kincaid
*Assistant Examiner*—Mehmood B Khan
(74) *Attorney, Agent, or Firm*—Browdy and Neimark, PLLC

(57) ABSTRACT

The invention relates to a method for analyzing the interference and supply situation in universal mobile telecommunication system (UMTS) sub-networks. Said method enables supply assertions for each service in the considered sub-network to be determined using measured data that is recorded either during or without the traffic load of the network.

8 Claims, 3 Drawing Sheets

| SC of the stations being interfered with | interfering cells | | | | |
|---|---|---|---|---|---|
| | 200 | 88 | 224 | 180 | 168 |
| 8 | 0 | 0 | 0 | 0 | 0 |
| 15 | 0 | 2,06 | 0 | 0 | 0 |
| 19 | 0 | 0 | 0 | 0 | 0 |
| 40 | 0 | 0 | 0 | 0 | 0 |
| 41 | 20,34 | 0 | 0 | 0 | 0 |
| 48 | 0,15 | 19,03 | 4,26 | 0 | 0,76 |
| 62 | 2,81 | 0 | 0 | 9,55 | 0 |
| 64 | 0 | 5,05 | 0 | 0 | 0,92 |
| 70 | 0 | 0 | 0 | 0 | 0 |
| 74 | 0 | 5,68 | 0 | 0 | 11,36 |
| | 23,3 | 31,82 | 4,26 | 9,55 | 13,04 |

METHOD FOR ANALYZING THE INTERFERENCE AND SUPPLY SITUATION IN UMTS SUB-NETWORKS

The invention relates to a method for analyzing the interference and coverage situation in UMTS (Universal Mobile Telecommunication System) subnetworks.

UMTS networks are based on ATM (Asynchronous Transfer Mode) and IP (Internet Protocol) and permit the transmission of circuit and packet oriented services. This is made possible by a new air interface for mobile radio communication, which can transmit different formats efficiently. In Europe and Japan, the air interface is based on the WCDMA (Wideband Code Division Multiple Access) radio technology. This permits the migration of a GSM infrastructure into an UMTS network. With WCDMA, Europe, as the worldwide most important mobile radio communication market, is receiving a unified UMTS standard. This also permits mobile broadband communication with Japan. The PDC (Personal Digital Cellular) standard used there can easily be integrated into WCDMA. In America, on the other hand, only a few GSM networks exist. The majority of networks are based on cdmaOne or IS95. These networks are migrating in the third mobile radio communication generation to CDMA 2000 (Code Division Multiple Access) and are compatible with WCDMA. The WCDMA modulation method is no longer based on time slots (Time Division) and the frequency is used "wide" (wideband). At 5 MHz, the transmission frequencies are 25 times wider than with GSM at only 200 kHz. These propagation properties affect both the cell capacity, and accordingly the network planning, as well as the reception quality. During times of low demand by one user, another user can use the channels. A user can also call on multiple data flows, e.g., talk on the telephone, fax, call up e-mails, download a file from the network and surf, at the same time.

From experience with IS95 CDMA networks and initial studies in WCDMA networks, it appears very important that an optimization of the radio signal coverage be performed under incorporation of measurement data. For this purpose the UMTS network is first measured and the existing interference and coverage situation is determined. The method described below is used to determine both, with only data from pilot channel measurements serving as the basis.

Interference matrices form the basis for the interference analysis. As a result of the pilot channel measurements, the received pilot channel power of multiple base stations is obtained for each measuring point. This opens up the possibility of preparing a measurement-data based interference matrix. In the process, the serving base station, as well as the interfering base stations are identified within a locally defined area (=pixel). If this is done across the entire measured area, a statement is obtained for all base stations in this area as to how much they interfere with other cells. This document describes how the interference matrix is prepared, and two different contents of the interference matrix are introduced.

The invention has as its object to present a method for analyzing the interference situation and coverage situation in UMTS subnetworks, on the basis of which areas can be determined that are not covered, and the reason for their lack of coverage. It is also a goal to be able to determine which service is available at what location.

This object is met according to the invention with the teaching of the independent claims.

Advantageous designs and improvements of the invention are specified in the dependent claims. The invention permits an examination of the interference and coverage situation for the most varied types of services while taking into consideration the traffic load, and the deduction of the measurement data back to the base without traffic load.

For the analysis of the network it is of great interest, which service is available at what location. The invention makes it possible to make statements regarding the availability of services based on the pilot channel measurement data with the network load generated by active users being taken into account. In this manner areas can be detected that are not receiving coverage, and the reason for the lack of coverage is presented. If both findings are combined, the methods described below permit necessary and comprehensive analyses of UMTS networks to be performed on the basis of simple pilot channel measurements. This can serve as a basis for further optimization measures.

One example embodiment of the invention will be explained based on the drawings. From the drawings and the following description, additional characteristics, advantages and applications of the invention will become apparent.

INPUT DATA

Figures 1, 2:
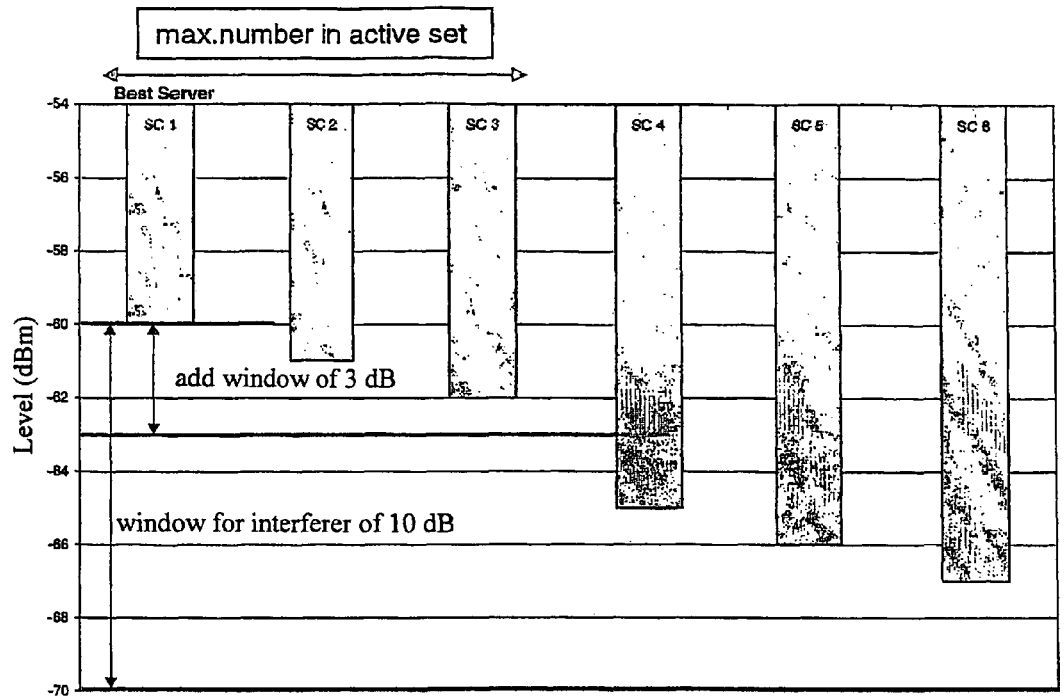
FIG. 1 is a graphic representation of the possible adjustments of the framework conditions for the interference analysis.
FIG. 2 shows an example of an interference matrix for a series of base stations.

The basis for the described methods are measurement data that are determined by so-called WCDMA scanners. These measuring instruments detect in the downlink the so-called common control channels (common control channels for establishing contact with the mobile stations), which are transmitted continuously regardless of traffic. They are the primary common pilot channel, referred to below as pilot channel, the primary synchronization channel, as well as the secondary synchronization channel. Of importance here is only the pilot channel. The measurement data that are relevant below are the received pilot channel power ($=E_c$), the total background noise power ($=I_o$) present in the given frequency band of 5 MHz, as well as the ratio of $E_c/I_o$, which thus defines the measured power of the pilot channel in relation to the total (interference) signal power. The allocation of the measured values to a base station takes place via the scrambling code (SC), which is also detected and shown by the measuring instrument. All of these data can be acquired per measuring point for multiple, e.g., for eight base stations, simultaneously.

In order to attain greater statistical reliability, the described methods are not based on the original data, but the original data are instead averaged within constant path intervals. Because of the scanning rate and statistical properties of the radio channel, the path interval should be at least 20 m. The prerequisite for both methods is that the measurement data are present within a defined area preferably with complete area coverage. During the analysis of the interference matrix, in particular, misinterpretations can occur if the potential coverage areas of individual cells have not been measured comprehensively.

Interference Analysis

In the case of the interference analysis, the so-called noise power density $E_c/N_o$, i.e., the energy per information bit in relation to the spectral noise power density at the input of the receiver, and the pilot pollution play a role. If a mobile station is located in a location where pilot signals can be received by multiple base stations with comparable power, a so-called pilot pollution results, i.e., an interference of the pilot signals with each other. While it is true that the analysis of the $E_c/N_o$ and pilot pollution is a quality measure for WCDMA networks, they do not lead in a targeted manner to the required measures for optimizing unacceptable locations/areas. In order to optimize the radio coverage, e.g., regarding the pilot pollution and $E_c/N_o$, the change in the slope of the antenna, i.e., reduction in antenna height, as well as the modification of the CPICH power (power of the common pilot channel) present themselves in an existing network. This requires an interference analysis as a basis. It can be performed with the aid of an interference matrix.

In order to prepare an interference matrix for each pixel (tiling), e.g., in a 10 dB window below the station measured as the Best Server registered as an interferer.[*] This method is shown schematically in FIG. 1. In order for stations that are required for the so-called Soft Handover (SHO) not to be rated as interferer, they must be removed from the analysis by means of an additional window. For this, the permitted number of stations in the active set and one additional window, e.g., a 3 dB window (add window for Handover HO) must be defined. In the example according to FIG. 1, the base station with the scrambling code SC1 represents the Best Server. The stations with the scrambling codes SC2 and SC3 are only insignificantly weaker and lie within a window of 3 dB below the power of the Best Server. The three stations SC1, SC2 and SC3 are therefore used for the Soft Handover. The remaining stations SC4-SC6 are in a window of e.g., 10 dB below the Best Server regarding their power and are rated as interferers.

[*]Translator's note: This translation is based on an incomplete sentence in the German-language document.

Depending on the implementation of the method, the window of the interferer is referenced to the Best Server or Best Server (negative values)+add window.

The interferers are determined according to the above pattern per area element (pixel). This data is summarized into a matrix. In this matrix the interference relationship of each station with other stations is listed with the number of occurrences.

In the matrix according to FIG. 2, it is apparent in detail in the individual analysis, in which cells and with which number of occurrences a cell (base station) appears as an interferer. The column of the base station SC88 has been marked to stand out. One can see that the station SC88 interferes with station SC48 with a number of occurrences of 125, i.e., SC48 is interfered with by SC88 in 125 measurements.

If the sum of individual interferences is now formed at each station, an overview is obtained that shows with which number of occurrences the individual stations appear as interferers in the measured area. A representation of this type according to FIG. 3 creates a first overview as to which station(s) carry with themselves a high potential of interferences. From FIG. 3 it is apparent that the station with the SC88 represents the biggest interferer in the analyzed subnetwork.

Conversely, the interference matrix may be used to see with which number of occurrences and by which cells, a cell's interference is caused. This has been marked to stand out in FIG. 2 in the cell for base station SC48 and can be depicted equivalent to FIG. 3. It is apparent that for cell SC48, the cells SC88 and SC224 represent the most frequent interferers.

Figures 3, 4:
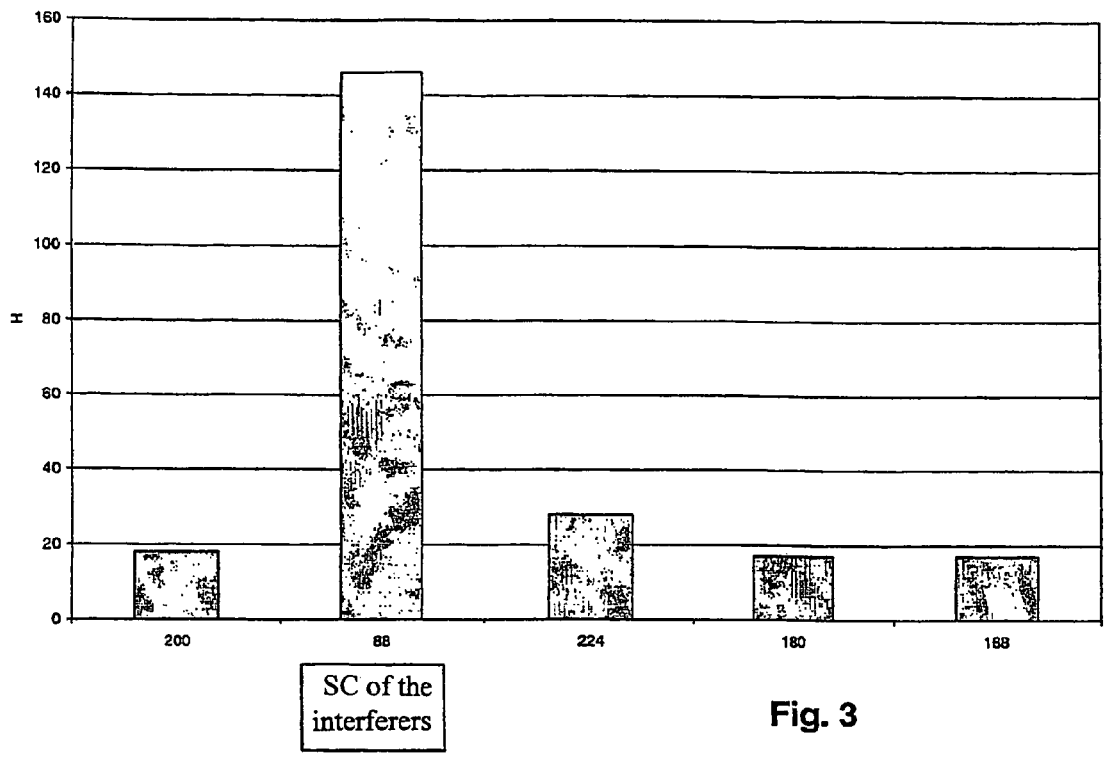
FIG. 3 is an interference matrix (sum) of the interferers in a graphic representation.
FIG. 4 is a matrix that states the probability [in %] of the interference relative to the area coverage.

FIG. 4 describes a probability of the interference as related to an area. In order to obtain a probability of the interference as related to an area of the Best Server, one first needs to determine how often a cell occurs as Best Server in the measured area, i.e., during how many measuring processes this cell is recorded as Best Server. The pixels (area elements) that are interfered with are placed in the ratio to the ones that are not interfered with and can be expressed as a percentage. The values obtained in this manner are weighed across the area.

Example cell SC48 is identified as the Best Server in 10,000 measurements (=10,000 area elements). The cell SC88, in the process, appears as an interferer 1903 times. The probability of the interference as related to the measured area therefore is 19.03%, as is apparent from FIG. 4. This preparation of the data provides the additional information, to which degree one cell is being interfered with by the other. In other respects FIG. 4 should be read exactly like FIG. 2.

Both interference matrices together provide the viewer with a very precise picture of the interference relationships and, resulting from this, the required measures.

Findings

The preparation of the interference relationships in a WCDMA network provides the opportunity to reduce the interference potential from certain stations, such as SC88, based on the measurement data, by changing the antenna slope or the CPICH power. Together with the other representations, such as Best Server ($E_c$), $E_c/N_o$, pilot pollution, and knowledge of the area, the stations can thus be selected for optimization in a targeted manner. Subsequent verification measurements will then reveal an improvement of the $E_c/N_o$ and pilot pollution.

Since the minimization of interferences represents an important factor in WCDMA networks for the capacity and quality, an analysis of this type must be categorized as very important.

Coverage Statement Based on Scanner Measurement Data

In accordance with the invention, a prognosis for the coverage situation can now be made in dependence upon the traffic load.

The below-described method has as its basis measurement values from pilot channel measurements that are initially performed in an UMTS network without active users, i.e., without traffic load.

Under specification of the network load in the uplink and downlink, a coverage statement is made based on these measured values for the uplink and downlink. In order to attain a higher degree of statistical reliability, the measured values may be averaged within certain path intervals and the coverage statement may be made based on these mean values.

We will begin with a few remarks regarding notation. $E_c$ commonly denotes the chip energy of the pilot channel and $I_o$ represents the background noise power density. Even though the following is based exclusively on power levels, the customary notation shall be maintained, i.e., $E_c$ corresponds to the received signal power of the primary common pilot channel (pCPICH). Additionally, transmit powers are denoted with S and received signal powers with P.

Coverage Statement for the Uplink

Based on the measured received level $E_c$ of the pilot signal, the received level $P_{UL}$ in the uplink may be calculated using $$P_{UL} = E_c + S_{MS\,max} - S_{pCPICH} \tag{1}$$

with $S_{MS\,max}$ maximum transmit power of the mobile station
$S_{pCPICH}$ pilot channel transmit power of the base station When determining $P_{UL}$ according to (1), one needs to take into consideration that the measured received signal power of the pilot channel cannot be determined directly but only after the correlation reception. This means that the orthogonality factor enters into $E_c$. Since the pilot signal is detected with only one RAKE finger of the receiver's, the orthoganility factor must be used for one RAKE finger. The true received signal power is therefore obtained from the received signal power $E_{c,mess}$ detected by the measuring instrument by using $$E_c = E_{c,mess}/\alpha_1 \quad (2)$$

wherein $\alpha_1$ corresponds to the orthogonality factor for one RAKE finger. The $E_c$ that has been determined in this manner must be used in the equations presented here.

A service is available in the uplink when the received signal power $P_{UL}$ exceeds a service-specific required minimum received level $P_{erf,UL}$. $P_{erf,UL}$ (in dBm) can be calculated based on the desired $E_b/N_o$ value that must be present in sufficient quality to guarantee a data transfer, as follows $$P_{erf,UL} = 10 \cdot \log(kT_o) + N_{f,BS} + (E_b/N_o)_{soll} + 10 \cdot \log(R) + L_{pen} + N_r - G_{TMA} + 30 \quad (3)$$

with
- k Boltzmann's constant ($=1.38 \cdot 10^{-23}$ Ws/Kelvin)
- $T_o$ ambient temperature (in degrees Kelvin)
- $N_{f,BS}$ noise factor of the base station (dB)
- $(E_b/N_o)_{soll}$ desired value (dB) for $E_b/N_o$ that must exist for a service to be available
- R effective data rate (service-specific) (kb/s)
- $L_{pen}$ penetration attenuation (dB)
- $N_r$ noise rise due to traffic (dB)
- $G_{TMA}$ gain due to a preamplifier in the vicinity of the antenna (TMA)

Both $(E_b/N_o)_{soll}$ as well as the effective data rate R may be different for each service, which is why $P_{erf,UL}$ must be calculated separately for each service being evaluated. The rise in noise level is caused by the background noise power of the active users and must be applied in accordance with the traffic scenario. In this context $N_r=3$ dB correspond to a load of 50%. This value was determined through calculation.

With (3) a service is considered available in the uplink if the following is true $$P_{UL} > P_{erf,UL} \quad (4)$$

$P_{UL}$ according to (1) is based on measured downlink values so that the impact of the antenna diagrams and signal supply losses (e.g., cable losses) in $P_{UL}$ are implicitly contained in $P_{UL}$ and do not need to be taken into account separately for the calculation of $P_{erf,UL}$.

Coverage Statement for the Downlink

In order for a service to be available in the downlink, two conditions must be met.
- The reception level lies above the required minimum reception level
- The existing value for $E_b/N_o$ is greater than the corresponding target value.

Even though the first condition can be directly derived from the second one, it shall nonetheless be reviewed separately here.

Determination of the Reception Level Necessary for a Service

First we will examine the first condition.

In the downlink, the received signal power of a traffic channel $P_{TCH}$ can be calculated based on the measured reception level $E_c$ of the pilot signal, using $$P_{TCH} = E_c + S_{TCH\,max} - S_{pCPTCH} \quad (5)$$

with
- $S_{TCH\,max}$ maximum transmit power of a traffic channel being allocated to a single user.
- $S_{pCPICH}$ pilot channel transmit power of the base station.

The minimum reception level $P_{erf,DL}$ (in dBm) is calculated with $$P_{erf,DL} = 10 \cdot \log(kT_o) + N_{f,MS} + (E_b/N_o)_{soll} + 10 \cdot \log(R) + L_{pen} + 30. \quad (6)$$

$M_{f,MS}$ represents the noise factor of the mobile station. The other parameters are analogous to (3). In principle, the rise in noise caused by the background noise power of active users should also be taken into consideration for the downlink, analogous to the uplink. However, this aspect is taken into account in the downlink primarily by estimating the $E_b/N_o$ value (as described below) and therefore ignored in the calculation of $P_{erf,DL}$.

Determination of Own-Cell Received Signal Power and Other-Cell Received Signal Power The above stated second condition—the existing value for $E_b/N_o$ is greater than the corresponding target value—requires that one can make a statement regarding the current value of $E_b/N_o$. The basis for this is provided by the measured values $E_c$ and $E_c/I_o$. Below, it will be described how, based on these measured values, a value of $E_b/N_o$ can be determined using certain specified assumptions. In order to calculate the $E_b/N_o$ value in the downlink, it is necessary to determine the received signal power from the own cell ($I_{eig}$) and the received signal powers from all other cells ($I_{fr}$). The "own cell" corresponds to the base station that effects, within one path interval, the highest mean pilot channel reception level (=Best Server).

First, $I_{eig}$ is determined. If one assumes that the pilot channel measurements take place in a network without traffic load, the received signal power $I_o$ results from the continuously transmitting downlink common control channels.

The received signal power $P_{CCH}$ of these control channels is obtained via $$P_{CCH} = E_c + 0.1 \cdot P_{pSCH} + 0.1 \cdot P_{sSCH} + 0.9 \cdot P_{BCH} \quad (7)$$

with
- $P_{CCH}$ received signal power of all continuously transmitting downlink common control channels
- $E_c$ received signal power of the pilot channel
- $P_{pSCH}$ received signal power of the primary synchronization channel (pSCH)
- $P_{sSCH}$ received signal power of the secondary synchronization channel (pSCH)
- $P_{BCH}$ received signal power of the broadcast channel (BCH)

Since pSCH and sSCH are transmitted alternating with the BCH, their transmit power is weighted in (7) with a factor corresponding to their respective portion of the transmission time.

The transmit power of the other downlink common control channels is stated relative to that of the pilot channel. This means that (7) can be expressed as $$P_{CCH} = E_c \cdot (1 + 0.1 \cdot \Delta_{pSCH} + 0.1 \cdot \Delta_{sSCH} \cdot 0.9 \cdot \Delta_{BCH}) \quad (8)$$

wherein $\Delta$ corresponds to the ratio of the corresponding transmit powers to that of the pilot channel. Simplified, the following is therefore true $$P_{CCH} = E_c \cdot (1 + \Delta_{CCH}) \quad (9)$$

If one assumes that the background noise power $I_o$ is not generated by active users but exclusively by the downlink common control channels, one ultimately obtains $$I_{eig} = P_{CCH} = E_c(1+\Delta_{CCH}) \quad (10)$$

With $I_{eig}$ according to (10), $I_{fr}$ is now determined. The following is true for the ratio $E_c/I_o$ $$\frac{E_c}{I_o} = \frac{E_c}{I_{eig} + I_{fr}} \quad (11)$$

This does not include the background noise which, however, is recorded in the measurement. The thermal noise power must therefore be subtracted from the measured $I_o$ ($=I_{o,mess}$)

$$I_o = I_{o,mess} - k \cdot T \cdot W. \quad (12)$$

The following therefore follows with (10) from (11) for the ratio $I_{eig}/I_{fr}$ $$\frac{I_{eig}}{I_{fr}} = \frac{E_c/I_o}{1/(1+\Delta_{cch}) - E_c/I_o} \quad (13)$$

and $I_{fr}$ is determined using $$I_{fr} = I_o - E_c \cdot (1 + \Delta_{CCH}). \quad (14)$$

Calculation of $E_b/N_o$

From the measured values of $E_c/I_o$ without traffic, the value for $E_b/N_o$ will be determined based on certain assumptions for the degree of utilization of a base station in the downlink. The prerequisite for this is the separation of the total received signal power $I_o$ into $I_{eig}$ and $I_{fr}$ according to (10) and (14).

Generally $E_b/N_o$ is calculated in the downlink using $$\frac{E_b}{N_o} = \frac{W}{R} \frac{P_{TCH}}{I'_{eig} \cdot (1-\alpha) + I'_{fr} + I_{[Illegible]}} * \quad (15)$$

* Translator's note: Illegible subscript in the German-language document wherein the apostrophe marks the variables under inclusion of the background noise powers from traffic channels. The following also applies $P_{TCH}$ Received signal power (downlink) of the traffic channel for a user of a certain service.

W Chip rate

α Orthogonality factor. However, in this case, the one for more than one RAKE finger needs to be given, e.g., for 4 RAKE fingers.

For the subsequent analyses the following assumptions apply.

The transmit power of the pilot channel $S_{pCPICH}$ is given relative to the total transmit power $S_{RS}$ of the base station.

$$S_{pCPICH} = \Delta_{pCPICH} \cdot S_{BS}. \quad (16)$$

Accordingly the following applies for the transmit power of all downlink common control channels analogous to equation (9)

$$S_{CCH} = \Delta_{pCPICH} \cdot (1+\Delta_{CCH}) \cdot S_{BS} \quad (17)$$

The traffic load of the base station in the downlink is defined via the utilized power of all traffic channels, which is also provided relative to the total transmit power $S_{BS}$ of the base station. The transmit power $S_{aTCH}$, which is used for all traffic channels of one cell, is accordingly obtained from $$S_{aTCH} = \Delta_{aTCH} \cdot S_{BS}. \quad (18)$$

The value for $\Delta_{aTCH}$ is specified according to the desired traffic scenario. It determines the network load in the downlink.

The maximum transmit power $S_{TCH\ max}$ that is available to an individual user is also given relative to the total transmit power $S_{BS}$ of the base station $$S_{TCH\ max} = \Delta_{uTCH} \cdot S_{BS}. \quad (19)$$

Based on these assumptions the terms contained in (15) can be determined from the measured pilot channel data.

For the other-cell background noise power $I'_{fr}$ under incorporation of the additional interference $P_{aTCH}$ by the traffic channels the following applies $$\frac{I'_{fr}}{I_{fr}} = \frac{P_{CCH} + P_{aTCH}}{P_{CCH}} = 1 + \frac{\Delta_{aTCH}}{\Delta_{pCPICH} \cdot (1+\Delta_{CCH})} \quad (20)$$

After calculation of $I_{fr}$ by means of (14), $I'_{fr}$ is thus determined directly.

For the background noise power $I'_{eig}$ of the own cell under inclusion of the additional interference $I_{aTCH}$ by all traffic channels of the own cell the following applies $$I'_{eig} = I_{eig} + I_{aTCH} \quad (21)$$

with $$I_{aTCH} = E_c \cdot \frac{\Delta_{aTCH}}{\Delta_{pCPICH}} \quad (22)$$

one obtains $$I'_{eig} = E_c \cdot \left(1 + \Delta_{CCH} + \frac{\Delta_{aTCH}}{\Delta_{pCPICH}}\right) \quad (23)$$

Analogous to the above, the following applies for the maximum traffic channel received signal power that is available to a user of a service $$P_{TCHmax} = E_c \frac{\Delta_{uTCH}}{\Delta_{pCPICH}} \quad (24)$$

By substituting (20), (23) and (24) in (15), one obtains the downlink $E_b/N_o$ value based on pilot channel measurements.

The preconditions shall be summarized again as follows.

The received signal power $I_o$ does not contain any background noise power from traffic channels of active users.

For the traffic channel transmit power of a user, the maximally permitted transmit power is assumed by default.

The degree of utilization of the cells in the downlink is specified uniformly for all cells.

Figure 5:
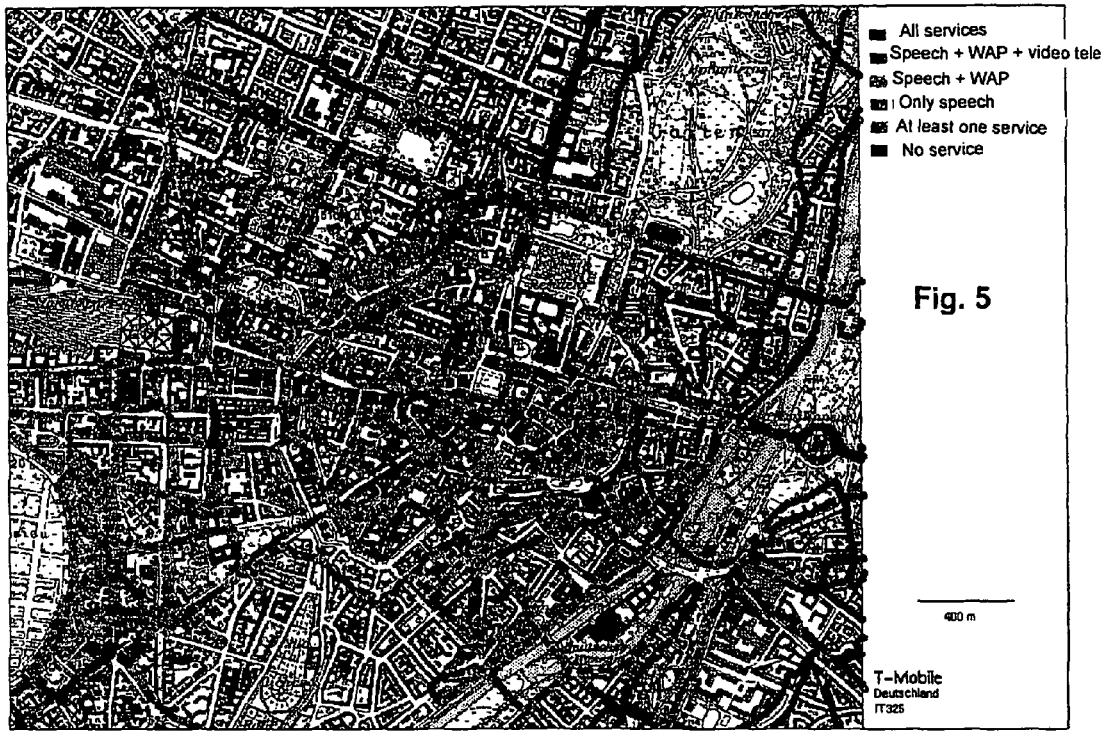
FIG. 5 shows an example for a visualization of the coverage statement arrived at according to the method.
Figure 6:
FIG. 6 shows an example of a visualization of the reason for the areas not covered in FIG. 5.

FIGS. 5 and 6 show examples for visualizations for estimating the coverage. The two figures reflect the results of the above-described method. Assumed in this context is a load of 50% in the uplink and 80% in the downlink. Shown is the coverage for indoors, for which an additional building attenuation of 15 dB is assumed.

Coverage Statement Based on Measurements in UMTS Networks with Traffic Load

An essential precondition for the above described method for estimating the coverage situation is that the measurement takes place in a network without active subscribers (i.e., without traffic load). This is no longer the case during subsequent measurements that are performed in networks in operation. The utilization and analysis of measurement data from a WCDMA scanner would thus be called into question or at least reduced in its application. The following now describes a method whereby the measurement data from a network under traffic load can be utilized further for the previously described interference analysis and coverage statements based on scanner measurement data.

The above-described method for coverage statements based on scanner measurement data may be applied for this purpose in a modified form. For this purpose, one assumes that $I_o$ results without traffic from the received signal power of the continuously transmitting downlink common control channels. With this assumption, $I_{eig}$ and $I_{fr}$ without traffic can be calculated using the sum of the received pilot channel signal powers of all base stations received at a measuring point. The following therefore applies for $I_{fr}$:

$$I_{fr} = (1 + \Delta_{CCH}) \cdot \sum_{k=2}^{N} E_{c,k} \quad (25)$$

and for $I_{eig}$ $$I_{eig} = E_{c,1} \cdot (1 + \Delta_{CCH}) \quad (26)$$

It is assumed in this context that, per measuring point, the received pilot channel signal power of N base stations can be detected and k=1 corresponds to the Best Server. This approach contains a fundamental problem in that mean values are analyzed within a path interval. The determination of $I_{fr}$ and $I_{eig}$ with (25) and (26), respectively, must take place with values that are not averaged since the received base stations and their field strengths can change from measuring point to measuring point and can therefore not be regarded as constant within a path interval. From this aspect it appears questionable whether the determination of $I_{eig}$ and $I_{fr}$ according to (25) and (26) is meaningful. It remains to be examined whether one should instead determine $I_o$ analogous to (25) but inclusive of the Best Server for each measuring point, and then based on that an average value within the path interval. After that, the calculations starting with equation (7) can then be identical.

An additional uncertainty of this method lies in whether the measurement receiver is detecting the pilot channels of all relevant base stations and $I_o$ is thus calculated correctly. For this reason the coverage statement should be based on measured $I_o$ as long as there is no traffic present in the network.

What is claimed is:

1. A method for analyzing the interference and coverage situation in a UMTS subnetwork having a plurality of base stations, each base station having an assigned scrambling code SC, comprising the steps:

acquiring measurement data with a measuring instrument within specified area elements of a defined area, wherein, in each area element, the measurement data including the received signal power of at least one downlink pilot channel of multiple base stations that can be received in this area element, and the total background noise power in the analyzed frequency band, said step of acquiring being carried out only while the subnetwork is without traffic load, and wherein the measurement data includes a received pilot channel power Ec, a total background noise power Io present in a given frequency band of 5 MHz, and a ratio Ec/Io, which thus define the measured power of the pilot channel in relation to total interference signal power;

detecting the scrambling code SC of each base station with the measuring instrument;

allocating the acquired measurement data to a base station via a detected scrambling code SC assigned to which base station;

identifying one of the base stations as a Best Server, based on the acquired measurement data; and preparing an interference matrix based on the acquired measurement data, wherein for the preparation of the interference matrix for each area element, base stations having a power lying in a 10 dB window below the power of the Best Server are registered as interferers, and base stations that are necessary for a Soft Handover, SHO, are not rated as interferers, wherein the interference matrix reflects a statement regarding the interference relationship of each base station with other base stations, said Ec being determined after correlation reception by considering an orthogonality factor of one rake finger.

2. A method according to claim 1, characterized in that for the analysis of the interference situation and radio coverage, a statement regarding the radio coverage in the uplink and downlink is determined on the basis of the acquired measurement data under specification of an assumed traffic load of the network.

3. A method according to claim 2, characterized in that, in each area element, the received signal power of the continuously transmitting pilot channels of multiple base stations that can be received in this area element is identified within each area element, and a statement regarding the radio coverage in the uplink and downlink is determined by forming the ratio of the received signal power from the analyzed cell ($I_{eig}$) and the received signal powers from all other cells ($I_{fr}$).

4. A method according to claim 3, characterized in that the measurement data are acquired during operation, i.e., during regular traffic load of the network.

5. A method according to claim 2, characterized in that the radio coverage is determined separately for each available service.

6. A method according to claim 2, characterized in that a service-specific effective data rate (R) is used as a criterion for determining the radio coverage.

7. A method according to claim 2, characterized in that a service-specific desired value for the signal-to-noise ratio $(E_b/N_O)_{soll}$ is used as a criterion for determining the radio coverage.

8. The method of claim 1, further comprising performing adjustments at at least one of the base stations on the basis of data provided in the interference matrix.

* * * * *